US006664664B2

United States Patent
Botos et al.

(10) Patent No.: US 6,664,664 B2
(45) Date of Patent: Dec. 16, 2003

(54) PRINTED CIRCUIT LINEAR MOTOR

(75) Inventors: Stephen J. Botos, Allegheny County, PA (US); Robert T. Novotnak, West Moreland County, PA (US)

(73) Assignee: Aerotech, Inc., Pittsburgh, PA (US)

( * ) Notice: Subject to any disclaimer, the term of this patent is extended or adjusted under 35 U.S.C. 154(b) by 0 days.

(21) Appl. No.: 09/877,644

(22) Filed: Jun. 8, 2001

(65) Prior Publication Data

US 2002/0185919 A1 Dec. 12, 2002

(51) Int. Cl.$^7$ .............................................. H02K 41/00
(52) U.S. Cl. ......................................................... 310/12
(58) Field of Search .......................................... 310/12

(56) References Cited

U.S. PATENT DOCUMENTS

| | | | |
|---|---|---|---|
| 2,970,238 A | 1/1961 | Swiggett | 310/268 |
| 2,993,135 A | 7/1961 | Henry-Baudot | 310/180 |
| 3,668,452 A | 6/1972 | Hu | 310/266 |
| 3,702,450 A | 11/1972 | Avery et al. | 335/213 |
| 3,777,292 A | 12/1973 | Fulenwider | 335/126 |
| 3,816,907 A | 6/1974 | Small | 29/598 |
| 3,950,662 A | 4/1976 | Burr et al. | 310/46 |
| 3,979,619 A | 9/1976 | Whiteley | 310/268 |
| 3,989,969 A | 11/1976 | Lazaroiu et al. | 310/268 |
| 4,039,876 A | 8/1977 | Takasaka | 310/266 |
| 4,051,398 A | 9/1977 | Kondo | 310/12 |
| 4,051,402 A | 9/1977 | Gruber | 310/266 |
| 4,115,915 A | 9/1978 | Godfrey | 29/596 |
| 4,388,547 A | 6/1983 | Gruber | 310/266 |
| 4,519,691 A | 5/1985 | Yamada et al. | 354/400 |
| 4,543,615 A | 9/1985 | Van Campenhout et al. | 358/285 |
| 4,645,961 A | 2/1987 | Malsky | 310/156 |
| 4,658,162 A | 4/1987 | Koyama et al. | 310/68 R |
| 4,760,294 A | 7/1988 | Hansen | 310/13 |
| 4,767,954 A | * 8/1988 | Philips | 310/12 |
| 4,962,329 A | * 10/1990 | Fujita | 310/208 |
| 5,023,495 A | * 6/1991 | Ohsaka | 310/12 |

* cited by examiner

*Primary Examiner*—Thomas M. Dougherty
*Assistant Examiner*—Iraj A. Mohandesi
(74) *Attorney, Agent, or Firm*—Webb Ziesenheim Logsdon Orkin & Hanson, P.C.

(57) ABSTRACT

A linear motor includes an armature having a plurality of side-by-side electrically conductive coils formed on an electrically and magnetically nonconductive substrate with adjacent coils electrically isolated from each other. Each coil includes a plurality of electrically conductive windings positioned coaxially and electrically connected so that in response to an electrical current flowing therethrough each winding produces a magnetic field having the same polarity. Each electrically conductive winding of each coil is preferably formed on a layer and a plurality of layers is laminated together to form the substrate.

22 Claims, 8 Drawing Sheets

PRINTED CIRCUIT LINEAR MOTOR

BACKGROUND OF THE INVENTION

1. Field of the Invention

The present invention relates to linear motors and, more particularly, to armatures of linear motors.

2. Background Art

A typical linear motor essentially includes N coils or N sets of coils fixedly positioned adjacent each other and a plurality of alternating north and south magnetic poles positioned in spaced parallel relation to the coils. The coils and the plurality of magnetic poles are movable with respect to each other in response to each of the N coils or the N sets of coils receiving selective excitation from an N phase source of electrical power.

In the prior art, each coil of a linear motor is formed from a continuous conductor wound into a suitable form. The cross-sectional area of the conductors utilized to form each coil of a linear motor is selected based on the force the linear motor is designed to generate. Thus, a linear motor designed to produce a greater force will typically have coils wound from wire having a larger cross-sectional area, while a linear motor designed to produce a lesser force has coils wound from wire having a smaller cross-sectional area. It is to be appreciated, however, that the number of turns of coils multiplied by the current flowing therethrough determines the force generated by each coil of a linear motor. Generally speaking, however, wires having a larger cross-sectional area are utilized to form coils of linear motors designed to produce greater force and wires having smaller cross-sectional areas are utilized to form coils of linear motors designed to produce lesser force.

There is a growing need for linear motors of reduced size for assembly of electronic components to electronic assemblies and for mating of fiber optic assemblies. A problem with producing a smaller linear motor, however, is that the desired cross-sectional area of wire utilized to form the coils of these linear motors is smaller than the smallest cross-sectional area of wire conventional state-of-the-art coil winding machines are designed to process. Thus, as the cross-sectional area of the wire utilized to form coils of a linear motor decreases, the difficulty in winding such wire into coils for linear motors increases. This difficulty arises from the physical limitations of coil winding machines to effectively manipulate wires having smaller cross-sectional areas suitable for use in smaller linear motors. Accordingly, there is a need to produce smaller linear motors of reduced size having coils formed from one or more conductors, each conductor having a smaller cross-sectional area than the smallest cross-sectional area of a wire capable of being wound into a linear motor coil by a conventional coil winding machine.

It is, therefore, an object of the present invention to overcome the above problem and others by providing a linear motor having coils formed from one or more conductors having a cross-sectional area smaller than the smallest cross-sectional area of wire capable of being wound effectively with conventional coil winding equipment. It is an object of the present invention to provide linear motor coils formed utilizing a photolithographic process. Still other objects of the present invention will become apparent to those of ordinary skill in the art upon reading and understanding the following detailed description.

SUMMARY OF THE INVENTION

Accordingly, we have invented a linear motor comprising a magnet track and a magnet assembly coupled to the magnet track. The magnet assembly has a plurality of side-by-side alternating magnetic north poles and magnetic south poles. The linear motor also includes an armature having a plurality of side-by-side electrically conductive coils formed on an electrically and magnetically nonconductive substrate, preferably a printed circuit board (PCB), which is movably coupled to the magnet track such that the side-by-side electrically conductive coils are positioned and movable in spaced parallel relation to the side-by-side alternating magnetic poles. The substrate includes a plurality of electrically nonconductive layers laminated together. Each layer has a plurality of electrically conductive windings formed thereon in side-by-side relation on at least one surface thereof with adjacent conductive windings of each layer electrically isolated from each other on the layer. Each electrically conductive winding of each layer is positioned in registration and electrically connected with a corresponding electrically conductive winding on each other layer to form one of the electrically conductive coils.

For each coil, the electrically conductive windings on adjacent layers are configured so that magnetic fields produced thereby in response to an electric current flowing through each electrically conductive winding are additive.

The electrically conductive windings of adjacent layers forming one of the electrically conductive coils are connected in series (i) on or adjacent the centers of the electrically conductive windings or (ii) adjacent the perimeters of the electrically conductive windings. The electrical current flows around the central axis of one of the electrically conductive windings of adjacent layers from a perimeter thereof toward the central axis and flows around the central axis of the other of the electrically conductive windings of adjacent layers from on or adjacent the central axis toward the perimeter thereof.

Preferably, each layer includes a plurality of heat transfer vias therethrough. The plurality of heat transfer vias of each layer is positioned in registration with the corresponding plurality of heat transfer vias in the other layers. The windings of each coil positioned in registration are electrically connected via a conductor received in at least one hole and/or via formed in each layer. A plurality of spacers can be positioned between two or more adjacent layers for maintaining the two or more adjacent layers in spaced parallel relation with a gap therebetween. Each layer can be rigid or flexible and the magnet assembly can include at least one magnet coupled to the magnet track. The plurality of side-by-side electrically conductive coils can include an integer multiple of N coils, with every Nth coil electrically connected together.

In operation, selectively energizing adjacent conductive coils with different phases of an N phase electrical source causes the armature to move relative to the magnet assembly.

We have also invented a linear motor comprising a linear armature having a plurality of layers. Each layer has a plurality of electrically conductive windings formed thereon in side-by-side relation on one surface thereof. The plurality of layers is laminated together with a plurality of electrically conductive windings of each layer positioned in registration. Each electrically conductive winding on each layer is electrically connected with corresponding electrically conductive windings positioned in registration therewith on the other layers, and adjacent electrically conductive windings on each layer are electrically isolated from each other on the layer.

Electrically conductive windings in registration on adjacent layers are configured to produce magnetic fields that are additive in response to each of the electrically conductive windings in registration receiving an electrical current therethrough.

The electrically conductive windings in registration on adjacent layers have a common central axis. Around the central axis of each pair of electrically conductive windings in registration on adjacent layers, electric current flows in one of the pair of electrically conductive windings from a perimeter to the central axis thereof, and electrical current flows in the other of the pair of electrically conductive windings from the central axis toward a perimeter thereof. Two or more electrically conductive windings of each layer can be electrically connected.

Lastly, we have invented a motor comprising an armature having a plurality of side-by-side electrically conductive coils formed on an electrically and magnetically nonconductive substrate with adjacent coils electrically isolated from each other. Each coil includes a plurality of electrically conductive windings positioned coaxially and electrically connected so that in response to an electrical current flowing therethrough, each winding produces a magnetic field having the same polarity.

DETAILED DESCRIPTION OF THE PREFERRED EMBODIMENTS

Figure 1:
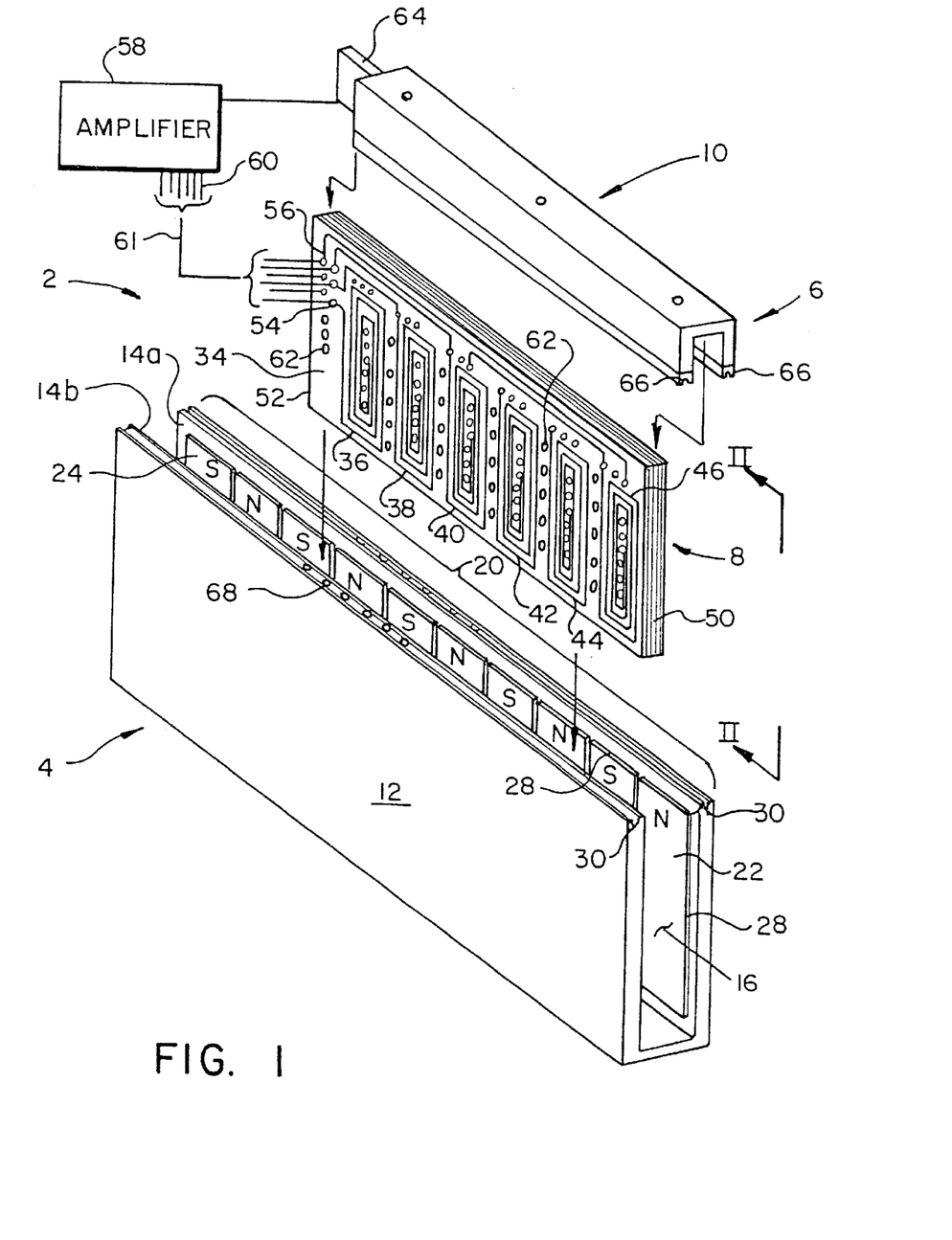
FIG. 1 is perspective view of a linear motor having an armature with a substrate formed in accordance with the present invention.

With reference to FIG. 1, a linear motor 2 includes a stator 4 and a forcer 6. Forcer 6 includes an elongated, preferably rectangular, armature 8 having an elongated upper edge received between legs of a U-shaped cover 10. Preferably, an epoxy (not shown) received between the legs of U-shaped cover 10 is utilized to secure the elongated upper edge of armature 8 thereto with the legs of U-shaped cover 10 extending partially over opposite surfaces of armature 8.

Stator 4 includes a U-shaped magnet track 12 having a pair of upwardly extending legs which have a pair of opposing surfaces 14a and 14b which define a gap 16 between the legs of U-shaped magnet track 12. A magnet assembly 20 is received in gap 16 and is secured to surface 14a. The side of magnet assembly 20 opposite surface 14a has a plurality of side-by-side alternating magnetic north poles 22 and magnetic south poles 24. Magnet assembly 20 can be formed from a plurality of bar magnets 28 positioned side-by-side along the length of gap 16 or from a single elongated magnet (not shown) having magnetic north poles 22 and magnetic south poles 24 formed therein.

Another magnet assembly 20 can be secured to surface 14b across gap 16 from magnet assembly 20 secured to surface 14a. Preferably, the magnetic poles 22 and 24 of the magnet assembly 20 secured to face 14b are the magnetic complement of magnetic poles 22 and 24 of magnet assembly 20 secured to surface 14a. Thus, across gap 16, each magnetic north pole 22 of magnet assembly 20 secured to surface 14a is in opposition with a magnetic south pole 24 of the magnet assembly 20 secured to surface 14b. Moreover, across gap 16, each magnetic south pole 24 of magnet assembly 20 secured to surface 14a is in opposition with a magnetic north pole 22 of magnet assembly 20 secured to surface 14b. The terminal ends of the legs of U-shaped magnet track 12 includes bearing races 30 to be described hereinafter.

Armature 8 includes an electrically and magnetically nonconductive substrate 34, preferably a printed circuit board (PCB), having a plurality of electrically conductive coils 36–46 formed thereon in side-by-side relation between a first end 50 and a second end 52 of substrate 34. Preferably, adjacent coils 36–46 are electrically isolated from each other. Adjacent second end 52, substrate 34 includes an array of plated through-holes 54 which extend through substrate 34. A plurality of printed circuit leads 56 formed on substrate 34 electrically connect pairs of plated through-holes 54 to one or more coils 36–46.

Each plated through hole 54 can be connected to an amplifier 58 via a conductor 60 of a wiring harness 61. Amplifier 58 supplies to coils 36–46 appropriate drive signals which cause currents I to flow through coils 36–46 in a manner known in the art to produce relative motion between forcer 6 and stator 4.

Substrate 34 preferably includes a plurality of heat transfer vias 62 which extend through substrate 34. These heat transfer vias 62 enable heat generated by armature 8 during operation to flow from the inside of substrate 34 to the surfaces thereof.

Linear motor 2 includes a Hall-effect sensor 64 preferably connected to U-shaped cover 10 adjacent one end thereof. Hall-effect sensor 64 is electrically connected to amplifier 58 which utilizes the output of Hall-effect sensor 64 to control the application of electrical currents I to coils 36–46 to produce relative motion between forcer 6 or stator 4. The terminal ends of the legs of U-shaped cover 10 include bearing races 66.

When linear motor 2 is assembled, the upper edge of armature 8 is secured between the legs of U-shaped cover 10. Thereafter, armature 8 is received in gap 16 with coils 36–46 in spaced parallel relation to the side-by-side alternating magnetic poles 22 and 24 of the one or more magnet assemblies 20 also received in gap 16.

To enable forcer 6 to move relative to stator 4, bearings 68 are received between bearing races 30 of U-shaped magnet track 12 and bearing races 66 of U-shaped cover 10 when armature 8 is received in gap 16.

Figure 2:
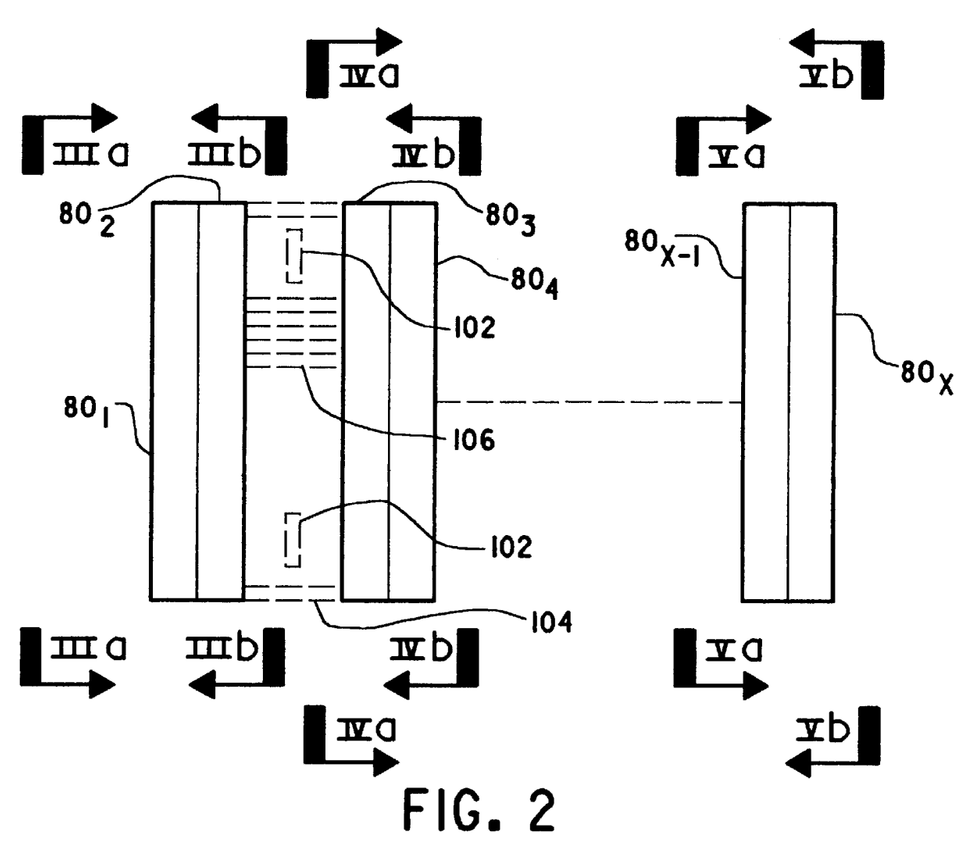
FIG. 2 is a partially exploded end view of the substrate taken along line II—II shown in FIG. 1.

With reference to FIG. 2, and with ongoing reference to FIG. 1, substrate 34 includes a plurality of electrically nonconductive layers $80_1$–$80_x$ laminated together. Each layer 80 can be formed from a rigid material, such as fiberglass, and/or a flexible material, such as a polyimide film. As shown in FIGS. 3a–5b, each layer 80 has a plurality of electrically conductive windings photolithographically formed thereon in side-by-side relation on at least one surface thereof. When the plurality of layers $80_1$–$80_x$ is laminated together, the plurality of side-by-side electrically conductive windings of each layer 80 is positioned coaxially and in registration. Each electrically conductive winding of each layer 80 is electrically connected with a corresponding electrically conductive winding in registration therewith on the other layers 80 to form one of the electrically conductive coils 36–46.

Figure 3A:
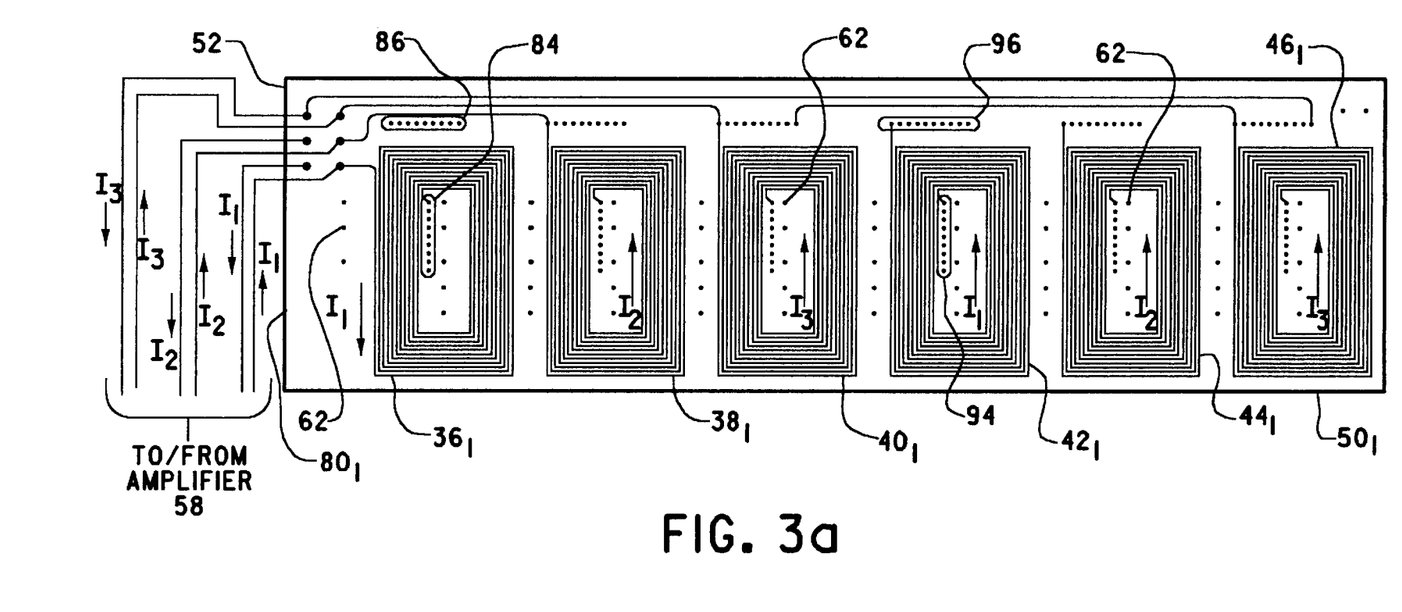
FIG. 3a is a view of the patterned surface of one of the layers forming the substrate taken along line IIIa—IIIa in FIG. 2.

Next, exemplary configurations of layers 80 forming an exemplary embodiment of substrate 34 will be described with reference to FIGS. 3a–5b, and with ongoing reference to FIG. 2. As shown in FIG. 3a, the patterned surface of layer $80_1$ includes a plurality of side-by-side electrically conductive windings $36_1$–$46_1$. Windings $36_1$–$46_1$ correspond to one layer of coils 36–46, respectively. Each of windings $36_1$–$40_1$ and $46_1$ of layer $80_1$ has one end connected to a unique one of plated through-holes 54. Moreover, windings $42_1$ and $44_1$ each have one end thereof electrically connected to a unique one of the plated through-holes 54, but these connections are made via windings $42_x$ and $44_x$ formed on the patterned surface of layer $80_x$ shown in FIG. 5b.

The winding directions and interconnections of windings $36_1$–$36_x$ will now be described with reference to a flow of current $I_1$. Assuming current $I_1$ enters winding $36_1$ from one of the plated through-holes 54, current $I_1$ flows in a counterclockwise direction in winding $36_1$, until it exits winding $36_1$ and enters winding $36_2$ via one of the plated vias 84 adjacent the centers of windings $36_1$ and $36_2$. Using the well-known right-hand rule, it can be determined that current $I_1$ flowing counterclockwise in winding $36_1$ produces a magnetic field having a polarization vector which extends outward from the patterned surface of layer $80_1$. The connection of windings $36_1$ and $36_2$ via one of the plated vias 84 will be described in greater detail hereinafter.

Figure 3B:
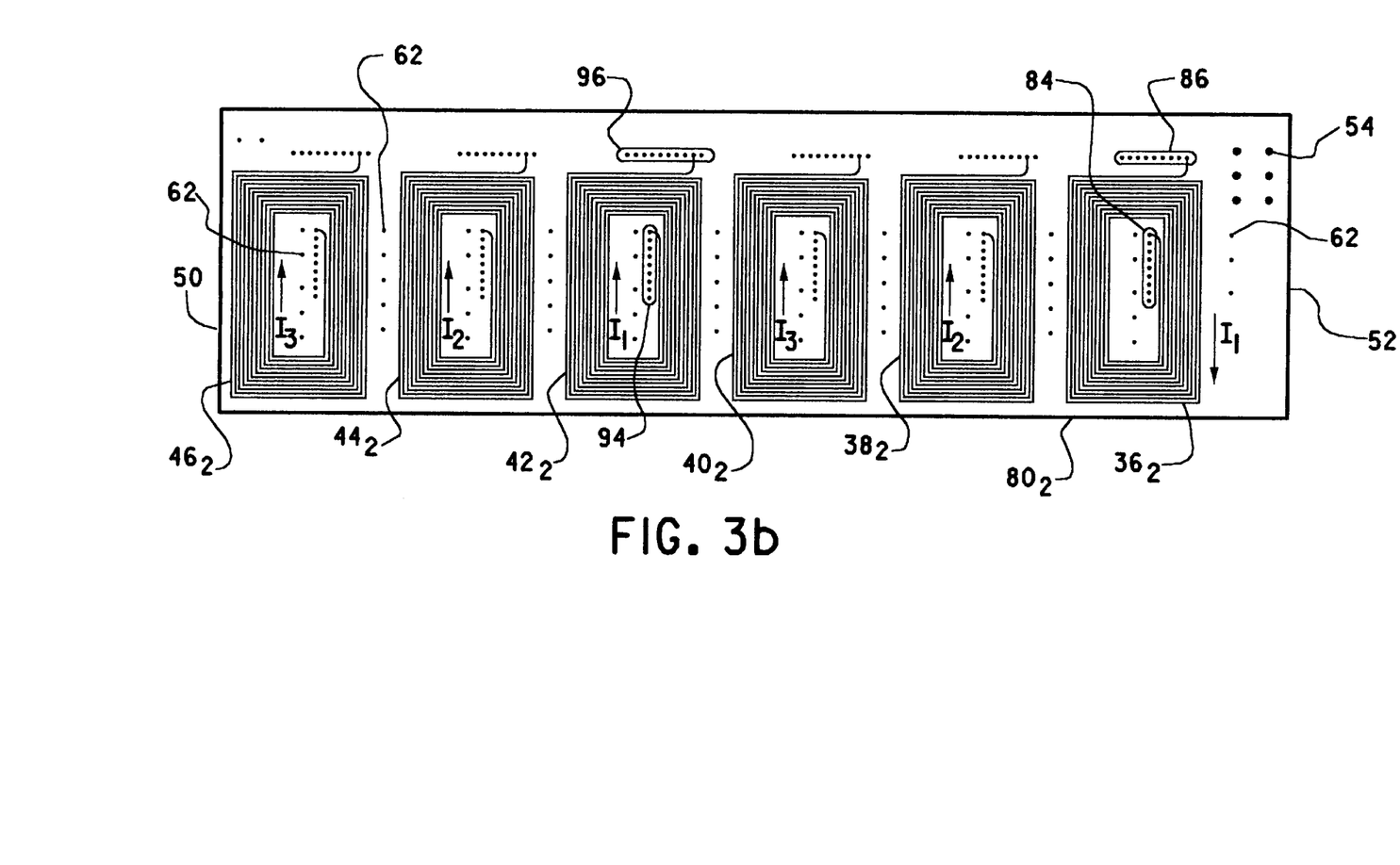
FIG. 3b is a view of the patterned surface of one of the layers forming the substrate taken along lines IIIb—IIIb in FIG. 2.

In the illustrated embodiment, the surfaces of layers $80_1$–$80_2$ not shown in FIGS. 3a–3b do not include a pattern or any conductive material thereon. These unpatterned surfaces of layers $80_1$ and $80_2$ are aligned and laminated together with windings $36_1$–$46_1$ of layer $80_1$ positioned coaxially and in registration with windings $36_2$–$46_2$ of layer $80_2$, respectively. In addition, plated through-holes 54 of layer $80_1$ are aligned with corresponding mirror image plated through-holes 54 of layer $80_2$; plated vias 84 and 86 associated with windings $36_1$–$46_1$ of layer $80_1$ are aligned with corresponding mirror image plated vias 84 and 86 associated with windings $36_2$–$46_2$ of layer $80_2$; and heat transfer vias 62 associated with windings $36_1$–$46_1$ of layer $80_1$ are aligned with corresponding mirror image heat transfer vias 62 associated with windings $36_2$–$46_2$ of layer $80_2$. To form an electrical connection between windings $36_1$–$46_1$ of layer $80_1$ and windings $36_2$–$46_2$ of layer $80_2$, an electrically conductive solder is flowed through the plated vias 84 and 86 of layers $80_1$ and $80_2$.

Current $I_1$ flows in a clockwise direction in winding $36_2$ thereby producing a magnetic field having a polarization vector which extends outward from the unpatterned surface of layer $80_2$. With layers $80_1$ and $80_2$ laminated together to form a pair of layers, as shown in FIG. 2, the polarization vectors of the magnetic fields produced by windings $36_1$ and $36_2$ in response to current $I_1$ flowing therethrough are in the same direction. Thus, the magnetic fields produced in response to current $I_1$ flowing through windings $36_1$ and $36_2$ are additive.

Figure 4A:
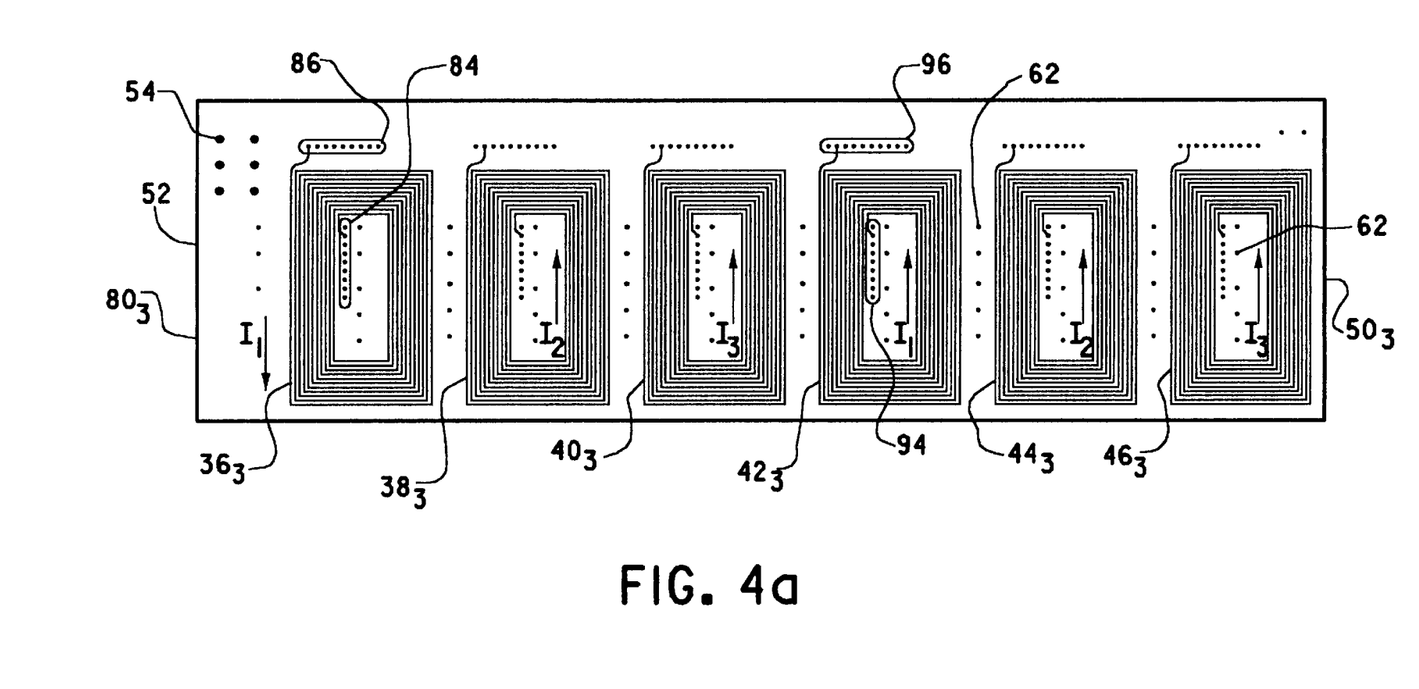
FIG. 4a is a view of the patterned surface of one of the layers forming the substrate taken along line IVa—IVa in FIG. 2.

With reference to FIG. 4a, and with ongoing reference to FIGS. 2–3b, in the illustrated embodiment, the patterned surface of layer $80_2$ and the patterned surface of layer $80_3$ are laminated together with the plurality of side-by-side windings $36_3$–$46_3$ of layer $80_3$ positioned coaxially and in registration with respective windings $36_2$–$46_2$ of layer $80_2$. In addition, plated through-holes 54 of layer $80_2$ are aligned with corresponding mirror image plated through-holes 54 of layer $80_3$; plated vias 84 and 86 associated with windings $36_2$–$46_2$ of layer $80_2$ are aligned with corresponding mirror image plated vias 84 and 86 associated with windings $36_3$–$46_3$ of layer $80_3$; and heat transfer vias 62 associated with windings $36_2$–$46_2$ of layer $80_2$ are aligned with corresponding mirror image heat transfer vias 62 associated with windings $36_3$–$46_3$ of layer $80_3$. To avoid shorting between each winding $36_2$–$46_2$ of layer $80_2$ and each respective winding $36_3$–$46_3$ of layer $80_3$ when layers $80_2$ and $80_3$ have their respective patterned surfaces laminated together, an insulative coating is deposited on each of the patterned surfaces of layers $80_2$ and $80_3$. To enable electrical connection between layers $80_1$–$80_x$, the insulative coating in alignment with through-holes 54, plated vias 84 and 86, and heat transfer vias 62 of each layer 80 is removed in a manner known to the art, leaving the insulative coating covering the remainder of the patterned surface of each layer 80. To form an electrical connection between windings $36_2$–$46_2$ on layer $80_2$ and respective windings $36_3$–$46_3$ on layer $80_3$, solder is flowed through aligned plated vias 84 and 86 of layers $80_2$ and $80_3$.

Current $I_1$ exiting winding $36_2$ enters winding $36_3$ via one of the plated vias 86 adjacent the upper edges of layers $80_2$ and $80_3$. Current $I_1$ flows in winding $36_3$ in a counterclockwise direction thereby producing a magnetic field having a polarization vector which extends outward from the patterned surface of layer $80_3$.

Figure 4B:
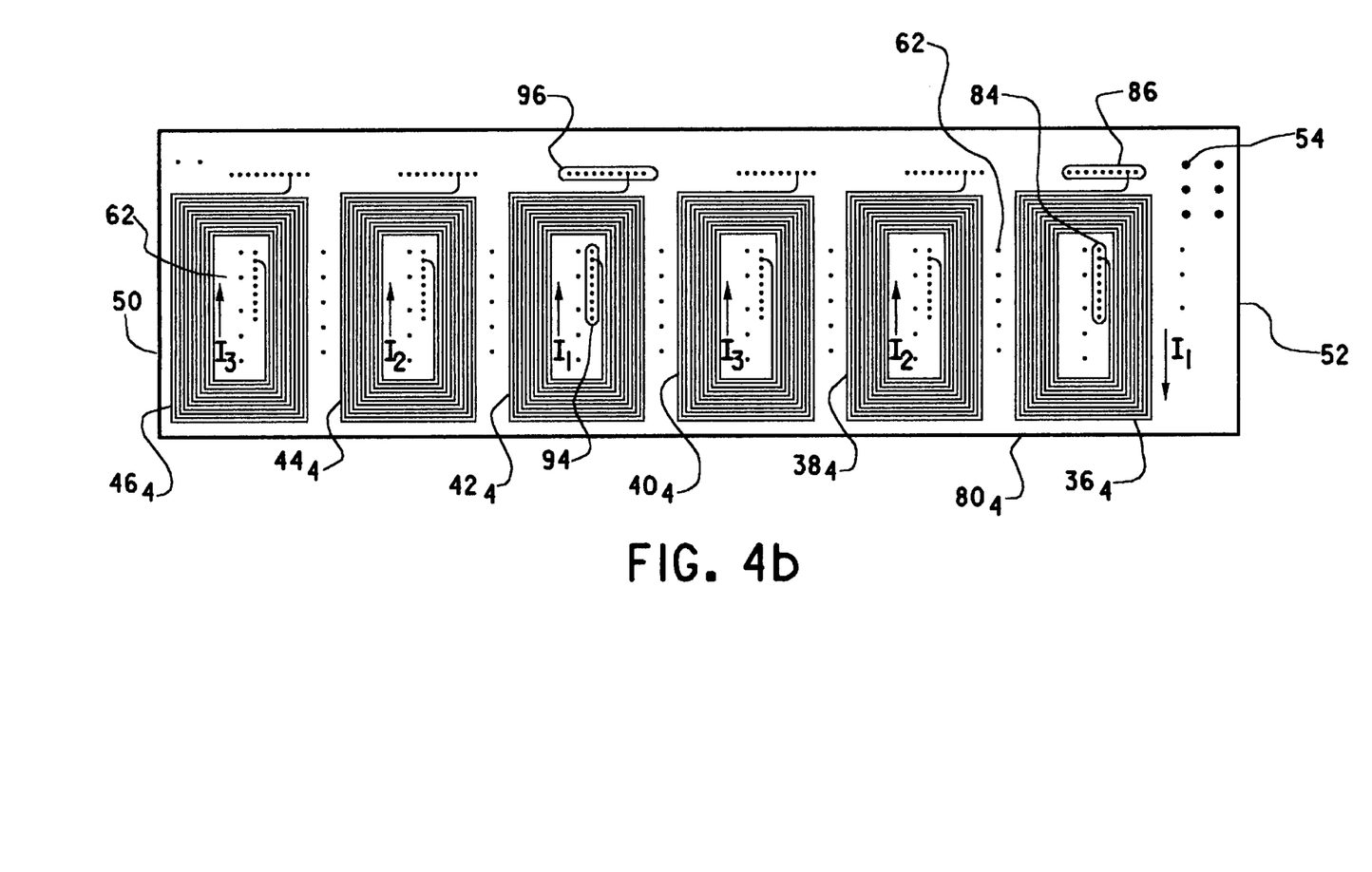
FIG. 4b is a view of the patterned surface of one of the layers forming the substrate taken along line IVb—IVb in FIG. 2.

With reference to FIG. 4b, and with ongoing reference to FIGS. 2–4a, current $I_1$ exits winding $36_3$ and enters winding $36_4$ via one of the plated vias 84 adjacent the centers of windings $36_3$ and $36_4$. Current $I_1$ flows in a clockwise direction in winding $36_4$ thereby producing a magnetic field having a polarization vector which extends through layer $80_4$ and outward from the unpatterned surface thereof. Since windings $36_3$ and $36_4$ are positioned coaxially and in registration when the unpatterned surfaces of layers $80_3$ and $80_4$ are laminated together to form a pair of layers, as shown in FIG. 2, the polarization vectors of the magnetic fields produced by windings $36_3$ and $36_4$ are additive. Moreover, the magnetic fields produced by windings $36_3$ and $36_4$ are additive with the magnetic fields produced by windings $36_1$ and $36_2$.

The arrangement of windings 36–46, plated through-holes 54, plated vias 84 and 86, and heat transfer vias 62, and the arrangement of layers $80_1$–$80_4$ discussed above, is repeated as necessary for layers (not shown) between layers $80_4$–$80_{x-1}$. To this end, the number of layers 80 utilized to form substrate 34 is a compromise among factors, such as the width of gap 16 of stator 4, the number of ampere-turns desired of each coil 36–46, and the like.

Figure 5A:
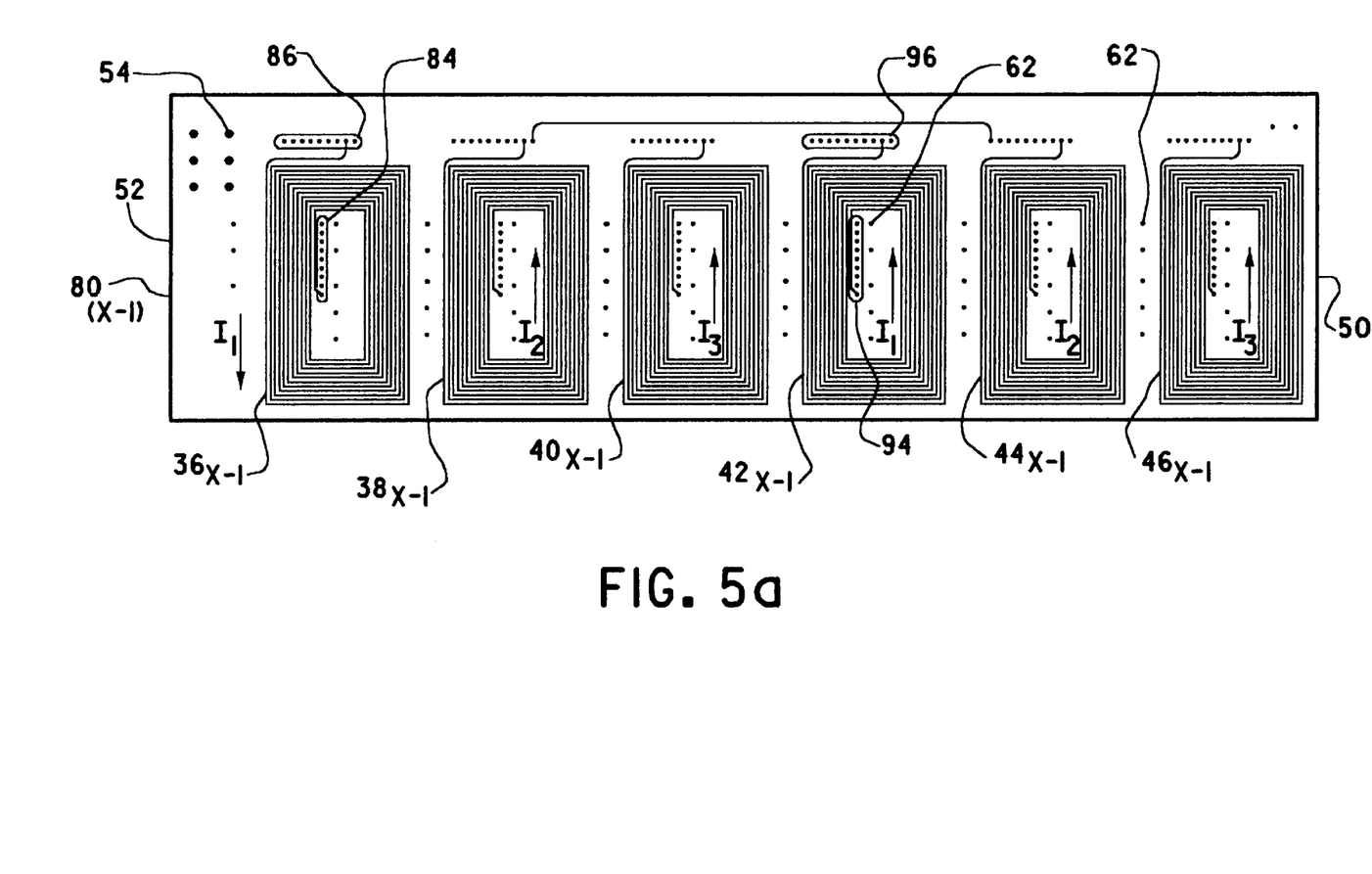
FIG. 5a is a view of the patterned surface of one of the layers forming the substrate taken along line Va—Va in FIG. 2.

Continuing now with the description of the illustrated embodiment, current $I_1$ flows through windings 36 of any layers 80 between layers $80_4$ and $80_{x-1}$ in a manner similar to that disclosed above for layers $80_1$–$80_4$. Referring to FIG. 5a, eventually, current $I_1$ enters coil $36_{x-1}$ via one of the plated vias 86 and flows in a counterclockwise direction in winding $36_{x-1}$ until it exits winding $36_{x-1}$ and enters winding $36_x$, shown in FIG. 5b, via one of the plated vias 84 adjacent the centers of winding $36_{x-1}$ and $36_x$. Current $I_1$ flowing counterclockwise in winding $36_{x-1}$ produces a magnetic field having a polarization vector which extends outward from the patterned surface of layer $80_{x-1}$. Current $I_1$ flows in a clockwise direction in winding $36_x$ thereby producing a magnetic field having a polarization vector which extends through and outward from the unpatterned surface of layer $80_x$. With layers $80_{x-1}$ and $80_x$ laminated together, as shown in FIG. 2, the polarization vectors of the magnetic fields produced by windings $36_{x-1}$ and $36_x$ in response to current $I_1$ flowing therethrough are in the same direction. Moreover, the magnetic fields produced in response to current $I_1$ flowing through windings $36_{x-1}$ and $36_x$ are additive with the magnetic fields produced by windings $36_1$–$36_4$ discussed above.

Figure 5B:
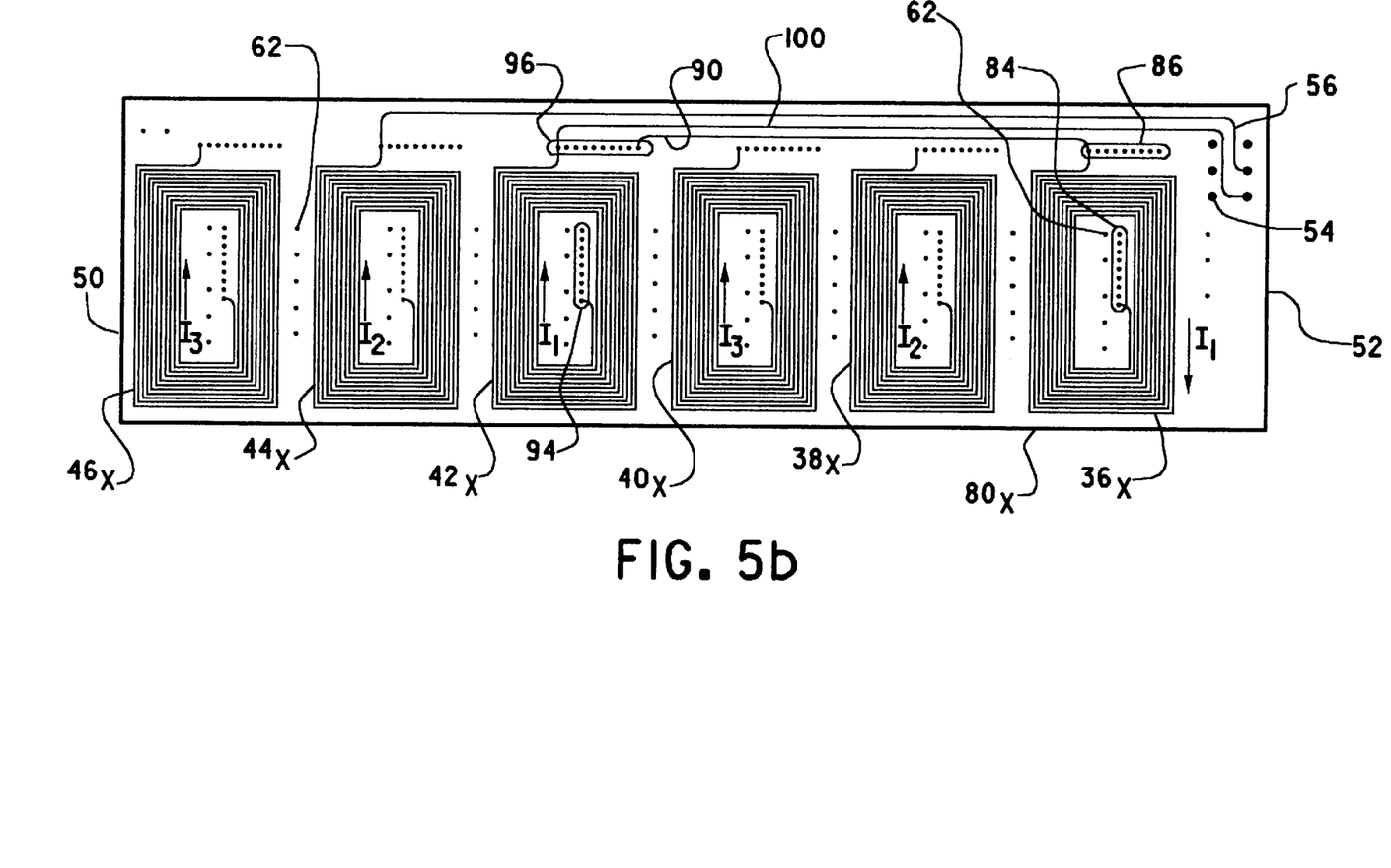
FIG. 5b is a view of the patterned surface of one of the layers forming the substrate taken along line Vb—Vb in FIG. 2.

In contrast to current $I_1$ exiting windings $36_1$–$36_{x-1}$, current $I_1$ exits winding $36_x$ via a printed circuit lead 90 which extends between one of plated vias 86 associated with winding $36_x$ and one of the plated vias 94 associated with winding $42_x$. To avoid current $I_1$ from returning to any of the windings $36_1$–$36_{x-1}$, the plated vias 86 connected to printed circuit lead 90 is not directly connected to windings $36_1$–$36_{x-1}$.

The plated via 94 connected to printed circuit lead 90 is connected in series between winding $36_x$ on layer $80_x$ and winding $42_1$ on layer $80_1$. Thus, current $I_1$ exiting winding $36_x$ on layer $80_x$ flows through printed circuit lead 90 and enters coil $42_1$ on layer $80_1$ via the plated via 96 connected to printed circuit lead 90.

Current $I_1$ flows in a counterclockwise direction in winding $42_1$ until it exits winding $42_1$ and enters winding $42_2$ via one of the plated vias 94 adjacent the centers of windings $42_1$ and $42_2$. Current $I_1$ flows through winding $42_2$ in a clockwise direction until it exits winding $42_2$ and enters winding $42_3$ via one of the plated vias 96 adjacent the upper edges of layers $80_2$ and $80_3$. Current $I_1$ flows in winding $42_3$ in a counterclockwise direction until it exits winding $42_3$ and enters winding $42_4$ via one of the plated vias 94 adjacent the centers of windings $42_3$ and $42_4$. Current $I_1$ flows in winding $42_4$ in a clockwise direction until it exits winding $42_4$ via one of the plated vias 96.

Current $I_1$ flows serially through windings 42 on layers 80 between layers $80_4$ and $80_{x-1}$ in alternating counterclockwise and clockwise directions in a manner described above for windings $42_1$–$42_4$. Eventually, current $I_1$ enters winding $42_{x-1}$ via one of the plated vias 96 and flows in a counterclockwise direction in winding $42_{x-1}$ until it exits winding $42_{x-1}$ and enters winding $42_x$ via one of the plated vias 94 at the center of windings $42_{x-1}$–$42_x$. Current $I_1$ flows in a clockwise direction in winding $42_x$ until it exits winding $42_x$ and flows to one of the plated through-holes 54 via a printed circuit lead 100.

As shown in FIG. 5b, the end of printed circuit lead 100 opposite the plated through hole 54 connected thereto is connected to one of the plated vias 96. To avoid current $I_1$ from returning to any of windings $42_1$–$42_{x-1}$, the plated via 96 connected to printed circuit lead 100 is not directly connected to windings $42_1$–$42_x$. It can be seen in FIGS. 3a and 5b that current $I_1$ enters winding $36_1$ via one of the plated through-holes 54 and returns to amplifier 58 via an adjacent plated through hole 54 after flowing serially through windings $36_1$–$36_x$ and $42_1$–$42_x$.

In the illustrated embodiment, the alternating counterclockwise and clockwise winding directions of windings $38_1$–$38_x$ and $40_1$–$40_x$, and $44_1$–$44_x$ and $46_1$–$46_x$ are the same as the counterclockwise and clockwise winding directions of windings $36_1$–$36_x$ and $42_1$–$42_x$, respectively. More specifically, windings $38_1$–$38_x$ are connected in series with windings $44_1$–$44_x$ and windings $40_1$–$40_x$ are connected in series with windings $46_1$–$46_x$ in a manner similar to windings $36_1$–$36_x$ connected in series with windings $42_1$–$42_x$ in the manner described above. Thus, a current $I_2$ flows serially through windings $38_1$–$38_x$ and $44_1$–$44_x$ in the same manner described above for current $I_1$ flowing serially through windings $36_1$–$36_x$ and $42_1$–$42_x$, and a current $I_3$ flows serially through windings $40_1$–$40_x$ and $46_1$–$46_x$ in the same manner described above for current $I_1$ flowing serially through windings $36_1$–$36_x$ and $42_1$–$42_x$.

As discussed above, windings $36_1$–$36_x$ are positioned coaxially and in registration when layers $80_1$–$80_x$ are laminated together. The winding directions and interconnections of windings $36_1$–$36_x$ to each other form coil 36. Because of the interconnections and the clockwise and counterclockwise winding directions of the windings associated with coil 36, the magnetic fields produced by windings $36_1$–$36_x$ have polarization vectors that extend in the same direction. Thus, the total magnetic field produced by coil 36 is the sum of the magnetic fields produced by each winding $36_1$–$36_x$ thereof in response to current $I_1$ flowing therethrough. Similar comments apply in respect of the magnetic fields produced by current $I_1$ flowing through windings $42_1$–$42_x$ which form coil 42; current $I_2$ flowing through windings $38_1$–$38_x$ and $44_1$–$44_x$ which form coils 38 and 44, respectively; and current $I_3$ flowing through windings $40_1$–$40_x$ and $46_1$–$46_x$ which form coils 40 and 46, respectively. Since the polarization vectors of the magnetic fields produced by the windings, e.g., $36_1$–$36_x$, of each coil, e.g., coil 36, extend in the same direction, the number of ampere-turns of each coil 36–46 is the sum of the ampere-turns of the windings forming each coil 36–46.

In operation of linear motor 2, amplifier 58 selectively controls a direction and duration of current $I_1$ through coils 36 and 42; a direction and duration of current $I_2$ flowing in coils 38 and 44; and a direction and duration of current $I_3$ flowing in coils 40 and 46 in a manner known in the art to produce on armature 8 a force which causes armature 8 to move in a desired direction along the length of gap 16.

From the foregoing description, it should be appreciated that armature 8 is configured for a three-phase electrical operation, with coils 36 and 42 connected to a first electrical phase of amplifier 58, coils 38 and 44 connected to a second electrical phase of amplifier 58, and with coils 40 and 46 connected to the third electrical phase of amplifier 58. Depending on the application of linear motor 2, however, armature 8 can be configured to receive more or less electrical phases from amplifier 58. In addition, armature 8 can be configured to have more or less than two coils per electrical phase, with the number of coils per electrical phase being determined by the amount of force to be generated by forcer 6. Still further, it should be appreciated that the direction of current I in adjacent windings forming each coil flows in the same direction. Thus, the force produced by current I flowing through the windings of each coil 36–46 in the presence of a magnetic field produced thereacross by magnet assembly 20 are additive. Lastly, the number of layers 80 that are laminated together to form armature 8 can be selected as a compromise between the desired ampere-turn of each coil 36–46, the maximum current I each coil 36–46 is configured to receive, and the maximum force to be produced by armature 8.

With reference back to FIG. 2, to facilitate transfer of heat from inner layers of layers 80 of armature 8, insulating spacers 102, shown in phantom in FIG. 2, can be received between two or more layers 80 forming substrate 34. Support pins/brackets 104, shown in phantom, can be utilized to secure the opposing surfaces of two layers 80 in opposition with spacers 102 sandwiched therebetween. Plural conductive wires 106, shown in phantom, can extend between the plated through-holes 54 and the plated vias, e.g., 84, 86, 94 and 96, extending between the windings of each coil 36–46, to form interconnections between the windings of each coil 36–46 held in opposition by spacers 102. Preferably, each pair of layers 80 having their patterned surfaces facing each other are spaced in opposition by spacers 102. If, however, the width of gap 16 will not permit spacers 102 between each pair of opposing patterned surfaces of layers $80_1$–$80_x$, one or more sets of spacers 102 can be selectively positioned between two or more layers 80 of armature 8. Spacers 102 can be utilized with or without heat transfer vias 62.

The invention has been described with reference to the preferred embodiments. Obvious modifications and alterations will occur to others upon reading and understanding the preceding detailed description. For example, while described in connection with a U-shaped magnet track 12, the magnet track could be a linear magnet track and substrate 34 could be held in spaced parallel relation with the magnets of such linear magnet track by suitable fixturing known in the art. Moreover, windings can be included on both surfaces of one or more of the layers 80 forming substrate 34. Still further, the alternating clockwise and counterclockwise winding directions of the windings forming each coil can be avoided by forming each coil with windings having the same winding direction and laminating the layers 80 together with their respective patterned surfaces facing the same direction. Moreover, while each layer 80 is described as having windings, e.g., $42_1$–$42_x$, configured to be connected to two or more phases of amplifier 58, each layer 80 can include windings configured to be connected to only one phase of amplifier 58. More specifically, two or more layers 80 can be laminated together to form a group of layers 80 having its windings electrically connected to one phase of amplifier 58. Plural groups of layers 80 can be formed and positioned adjacent each other with each group connected to a different phase of amplifier 58. Lastly, while the preferred embodiments are described as having the windings and coils of each phase connected in series, the windings and coils of each phase can be connected in parallel, or in some combination of series and parallel. It is intended that the invention be construed as including all such modifications and alterations insofar as they come within the scope of appended claims or the equivalents thereof.

What is claimed is:

1. A linear motor comprising:
   a magnet track;
   a magnet assembly coupled to the magnet track, the magnet assembly having a plurality of side-by-side alternating magnetic north poles and magnetic south poles; and
   a linear armature having a plurality of side-by-side electrically conductive coils formed on an electrically and magnetically nonconductive substrate which is movably coupled to the magnet track such that the side-by-side electrically conductive coils are positioned and movable in spaced parallel relation to the side-by-side alternating magnetic poles, the substrate including a plurality of electrically nonconductive layers laminated together, each layer having a plurality of electrically conductive windings formed thereon in side-by-side relation on at least one surface thereof with each pair of adjacent conductive windings of each layer electrically isolated from each other on the layer, each electrically conductive winding of each layer positioned in registration and electrically connected with a corresponding electrically conductive winding on each other layer to form one of the electrically conductive coils.

2. The linear motor as set forth in claim 1, wherein for each coil, the electrically conductive windings on adjacent layers are configured so that magnetic fields produced thereby in response to an electric current flowing through each electrically conductive winding are additive.

3. The linear motor as set forth in claim 2, wherein:
   the electrically conductive windings of adjacent layers forming one of the electrically conductive coils are electrically connected in series (i) on or adjacent the centers of the electrically conductive windings or (ii) adjacent the perimeters of the electrically conductive windings; and
   the electrical current flows around the central axis of one of the electrically conductive windings of adjacent layers from a perimeter thereof toward the central axis and flows around the central axis of the other of the electrically conductive windings of adjacent layers from on or adjacent the central axis toward the perimeter thereof.

4. The linear motor as set forth in claim 1, wherein:
   each layer includes a plurality of heat transfer vias therethrough; and
   the plurality heat transfer vias of each layer is positioned in registration with the corresponding plurality of heat transfer vias in the other layers.

5. The linear motor as set forth in claim 1, wherein the windings of each coil positioned in registration are electrically connected via a conductor received in at least one hole and/or via formed in each layer.

6. The linear motor as set forth in claim 5, wherein:
   each layer includes a plurality of heat transfer vias therethrough; and
   the plurality of heat transfer vias of each layer is aligned coaxially with the corresponding plurality of heat transfer vias in the other layer.

7. The linear motor as set forth in claim 1, further including a plurality of spacers positioned between two or more adjacent layers for maintaining the two or more adjacent layers in spaced parallel relation with a gap therebetween.

8. The linear motor as set forth in claim 1, wherein:
   each layer is rigid or flexible; and
   the magnet assembly includes at least one magnet coupled to the magnet track.

9. The linear motor as set forth in claim 1, wherein the plurality of side-by-side electrically conductive coils includes an integer multiple of N coils, with every Nth coil electrically connected together.

10. The linear motor as set forth in claim 9, wherein selectively energizing adjacent conductive coils with different phases of an N phase electrical source causes the armature to move relative to the magnet assembly.

11. A linear motor comprising a linear armature having a plurality of layers, each layer having a plurality of electrically conductive windings formed thereon in side-by-side relation on one surface thereof, the plurality of layers laminated together with the plurality of electrically conductive windings of each layer positioned in registration, wherein each electrically conductive winding on each layer is electrically connected with corresponding electrically conductive windings positioned in registration therewith on the other layers and with each pair of adjacent electrically conductive windings on each layer are electrically isolated from each other on the layer.

12. The linear motor as set forth in claim 11, wherein electrically conductive windings in registration on adjacent layers are configured to produce magnetic fields that are additive in response to each of the electrically conductive windings in registration receiving an electric current therethrough.

13. The linear motor as set forth in claim 12, wherein:

the electrically conductive windings in registration on adjacent layers have a common central axis; and around the central axis of each pair of electrically conductive windings in registration on adjacent layers, electric current flows in one of the pair of electrically conductive windings from a perimeter to the central axis thereof and electrical current flows in the other of the pair of electrically conductive windings from the central axis toward a perimeter thereof.

14. The linear motor as set forth in claim 12, wherein two or more electrically conductive windings of each layer are electrically connected.

15. The linear motor as set forth in claim 11, wherein:

each layer includes a plurality of heat transfer vias therethrough; and the plurality of heat transfer vias of each layer is aligned coaxially with the corresponding plurality of heat transfer vias in registration therewith in the other layers.

16. The linear motor as set forth in claim 11, further including a plurality of spacers positioned between two or more adjacent layers for maintaining the two or more adjacent layers in spaced parallel relation with a gap therebetween.

17. The linear motor as set forth in claim 11, wherein each layer is formed from flexible or rigid material.

18. A motor comprising a linear armature having a plurality of side-by-side electrically conductive coils formed on an electrically and magnetically nonconductive substrate with each pair of adjacent coils electrically isolated from each other, each coil including a plurality of electrically conductive windings positioned coaxially and electrically connected so that in response to an electrical current flowing therethrough each winding produces a magnetic field having the same polarity.

19. The motor as set forth in claim 18, wherein adjacent windings of each coil have opposite winding directions.

20. The motor as set forth in claim 18, wherein the windings of each coil are connected in series.

21. A linear motor comprising a linear armature having a plurality of layers, each layer having at least one electrically conductive winding formed thereon, with at least two of said layers separated from each in spaced parallel relation.

22. The linear motor of claim 21, further including spacing means positioned between said at least two layers for maintaining said at least two layers in spaced parallel relation.

* * * * *

UNITED STATES PATENT AND TRADEMARK OFFICE
CERTIFICATE OF CORRECTION

| | | |
|---|---|---|
| PATENT NO. | : 6,664,664 B2 | Page 1 of 1 |
| APPLICATION NO. | : 09/877644 | |
| DATED | : December 16, 2003 | |
| INVENTOR(S) | : Stephen J. Botos et al. | |

It is certified that error appears in the above-identified patent and that said Letters Patent is hereby corrected as shown below:

<u>Column 10</u>
      Line 25, in Claim 4, "the plurality heat" should read --the plurality of heat--.

<u>Column 12</u>
      Line 22, in Claim 21, "from each" should read --from each other--.

Signed and Sealed this

Twenty-second Day of January, 2008

JON W. DUDAS
*Director of the United States Patent and Trademark Office*